Sept. 11, 1951  R. N. HARPER  2,567,810
DENTAL PROSTHESIS AND DEVICE
Filed Sept. 13, 1948  3 Sheets-Sheet 1
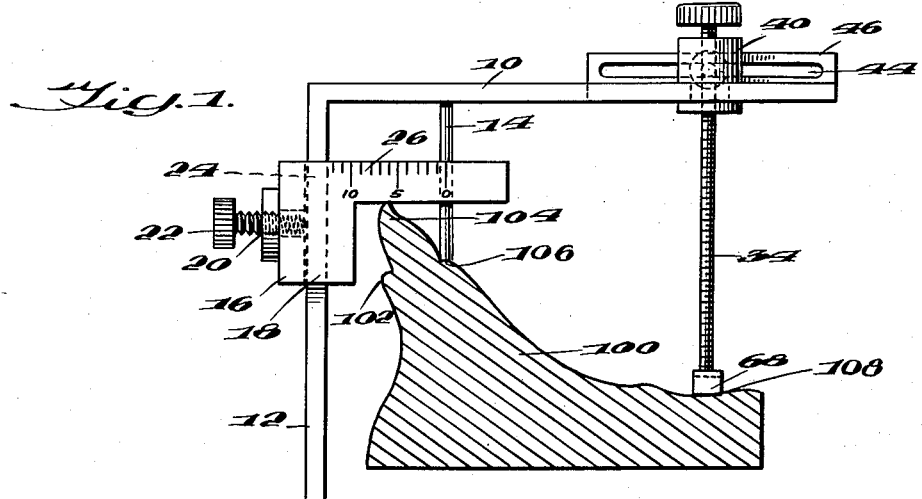
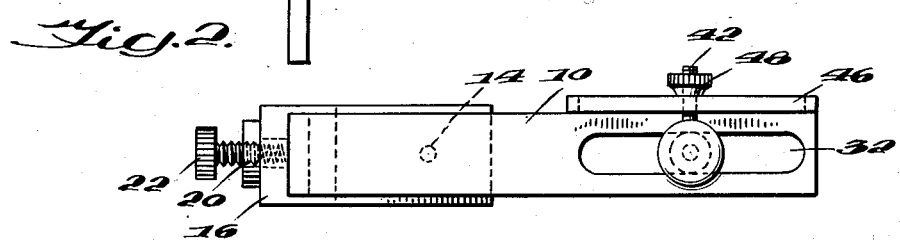
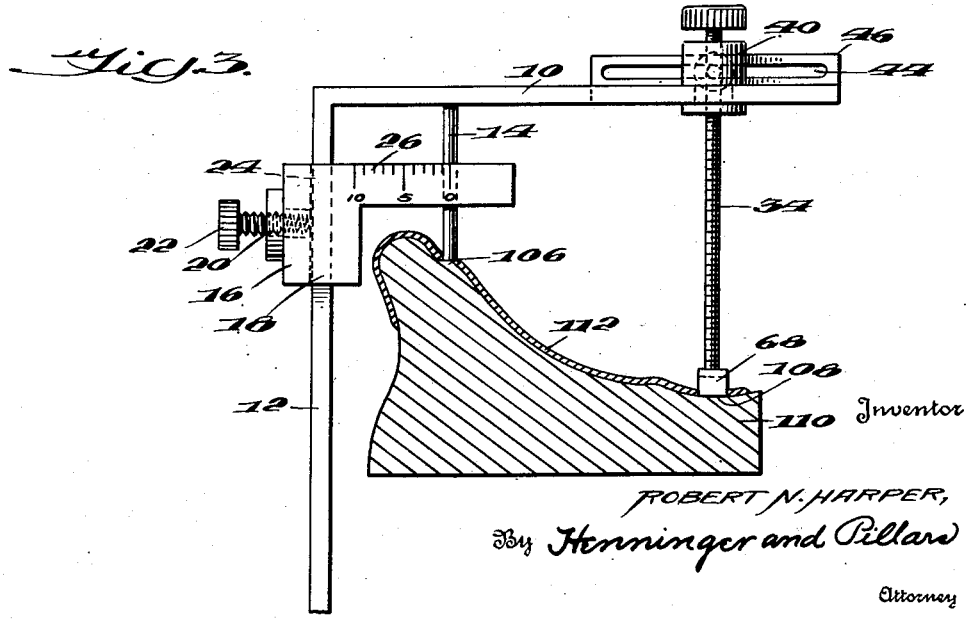
ROBERT N. HARPER,
By Henninger and Pillard
Attorney Sept. 11, 1951 R. N. HARPER 2,567,810
DENTAL PROSTHESIS AND DEVICE
Filed Sept. 13, 1948 3 Sheets-Sheet 2
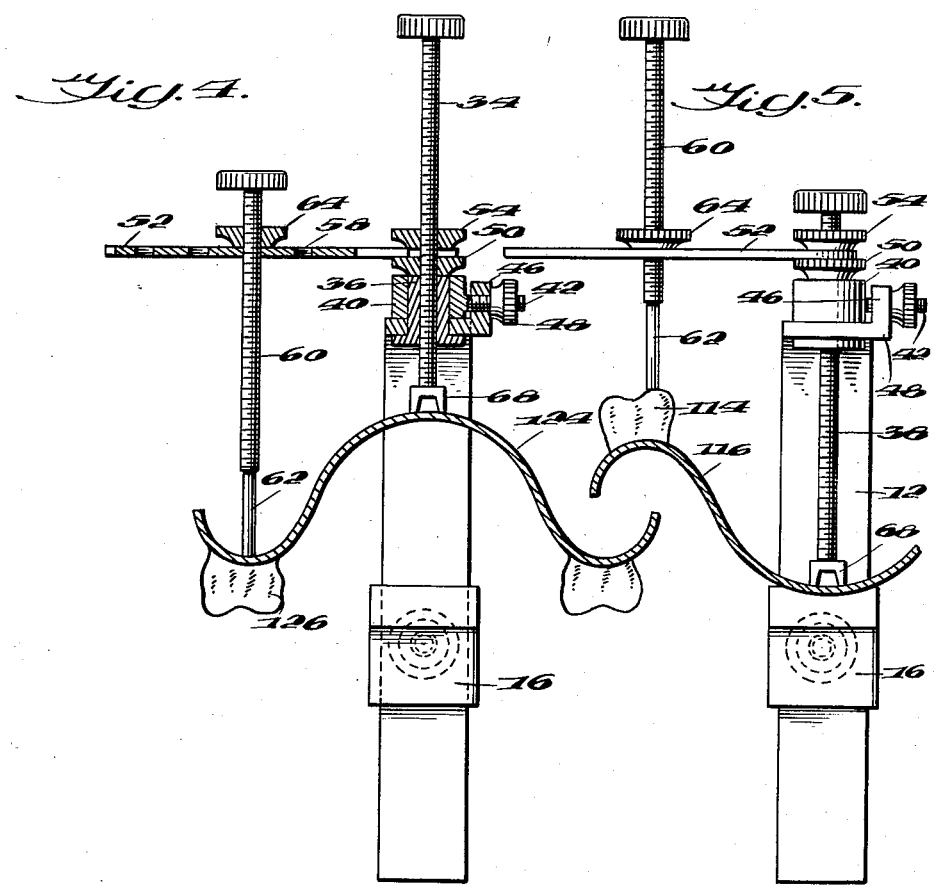
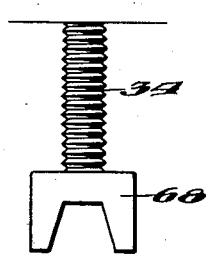 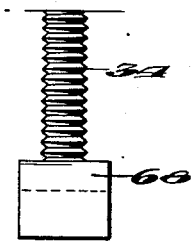 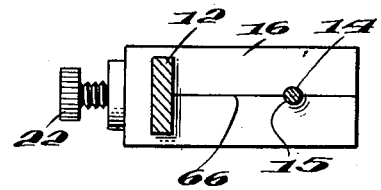
Inventor
ROBERT N. HARPER,
By Henninger and Pillans
Attorney

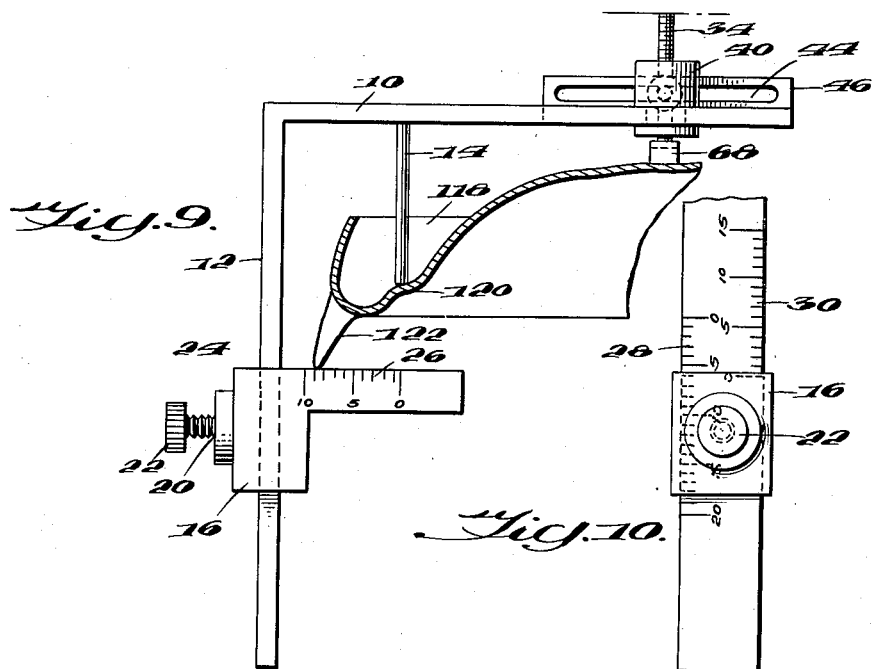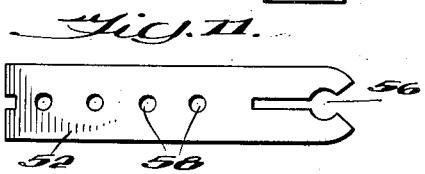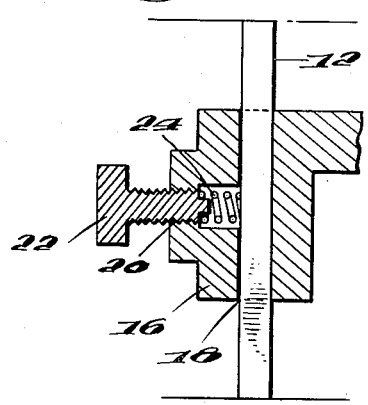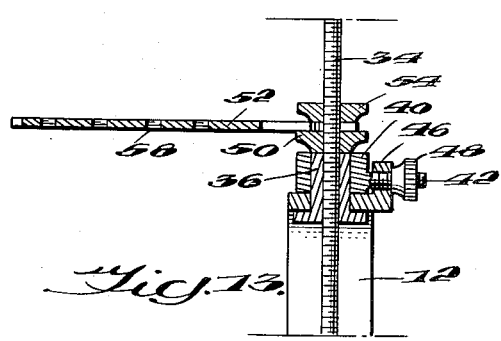
Inventor
ROBERT N. HARPER,
By Henninger and Pillars
Attorney Patented Sept. 11, 1951

2,567,810

UNITED STATES PATENT OFFICE 2,567,810

DENTAL PROSTHESIS AND DEVICE

Robert N. Harper, Danville, Va.

Application September 13, 1948, Serial No. 49,057

4 Claims. (Cl. 33—174)

This invention relates to a method and instrumentalities for the proper location of artificial teeth in a denture. More particularly, the invention relates to a method and means for obtaining diagnostic data to enable a prosthodontist to locate the spatial planes of the incisal edge of the centrals and the occlusal surfaces of the posteriors in the maxillary arch.

Denture prosthesis has as its aim the restoration of the function of mastication, the correction of disturbed facial dimensions and contour in compliance with aesthetic requirements, and the correction of speech defects due to the partial or complete loss of natural teeth in compliance with phonetic requirements.

These objectives have heretofore been attained imperfectly or with great difficulty because of imperfections in methods now used for interpreting the position of natural teeth and transferring such interpretation to the denture.

The anterior-posterior inclination of the edentulous maxillary ridge varies with the individual, and the normal inclination of the long axis of the centrals is determined by this individual inclination. Therefore, when the position of the incisal edges are recorded in a mouth on a bite rim and the maxillary cast is mounted in an articulator at an elevation that is different from the orientation of the maxillary in the head, there were resultant errors in length and inclination. Also the present method of recording the length of the incisal edges as represented on the bite rim, by outside markings, will result in error in the length of the centrals. When it is necessary to alter the anterior-posterior position of the centrals from that of the rim, the length of the centrals will be increased or decreased, depending on whether the centrals are set distally or mesially.

In order to set the artificial teeth accurately, it is necessary to determine certain critical planes of the teeth. First, it is necessary to ascertain the vertical planes of the labial surface of the centrals, and the buccal surfaces of the posteriors. Second, it is necessary to ascertain the horizontal plane of the incisal edge of the centrals and the occlusal surfaces of the posteriors where the plane of these surfaces intersect their respective vertical planes. Third, it is necessary to ascertain the saggital plane in its relation to the mesial surface of the centrals. In the dentate there is a relationship of these planes to the planes of other maxillary parts which are not affected by an edentulous condition. The accurate reconstruction of the entire maxillary arch, therefore, becomes possible.

It is the primary object of this invention to provide a method by which the prosthodontist may locate the necessary planes for the accurate setting of artificial teeth in a base plate, and to this end there is disclosed herein one form of dental instrument by which the method may be performed.

This invention involves a novel system of parallel and perpendicular measurements performed on a pre-extraction model, or an immediate denture, either with a whole or partial palate, and the subsequent transfer of such measurements in the edentulous treatment to a base plate in which the artificial teeth may be set in natural position in accordance with the mechanical planes ascertained from the model.

The absence of such procedure heretofore is explained by the fact that no maxillary structure of sufficient stability has been known upon which to base such measurements. My method is predicated on my discovery that the incisive papilla provides such stable structure.

A study of the maxilla discloses that the Median Raphe terminates anteriorly in a small pear-shaped eminence known as the incisive papilla. Structurally, the papilla is composed of unyielding tissue which is unaffected by the process of resorption. The papilla is located on the palatal median line and in the dentate it is just back of the central incisor, while on the edentulous ridge after resorption has occurred it is located distally to, or on, the center of the ridge.

My discovery that the incisive papilla is a stable point of reference and therefore a dependable basis for a technique by which measurements may be taken, provides the prosthodontist with accurate data from which natural speech, pleasing appearance, and normal function of mastication may be restored.

My research has involved the examination of pre-extraction and post resorptive models of many cases. It was found that while in a majority of cases a line through the center of the papilla is continuous with the median line, yet in only slightly more than half of the cases was the continuous papilla median line in the center of the face. In almost one half of human beings, therefore, the maxilla is oriented in an off-center position within the skull. This may be due to a bodily shift of the maxilla to one side of the Median Raphe perpendicular to the ridge or possibly to a pivotal shift with an inclination of the Raphe. In a few cases the papilla alone was in the center of the face and in others the papilla line was not in line with the median line or facial center. It was also found that the distance from the papilla to the incisal edges of the centrals varies in individual cases in both the vertical and horizontal planes. The distance from the papilla to the necks of the centrals varies in individual cases and it was also found that the distance from the papilla to the right and left centrals in some individual cases varies in the horizontal plane.

Among all these variables it was found, however, that there is no change in the position or dimension of the papilla or the Median Raphe in a mouth at the dentate stage from that of its position and dimensions at the edentulous stage.

It follows, therefore, that the incisive papilla may serve as a dependable reference point for a technique designed to reproduce in prosthodontia the horizontal and vertical position of the maxillary centrals; that the incisive papilla is a dependable reference point for a technique designed to reproduce the height of the natural occlusal plane; and that the incisive papilla is a dependable reference point for a technique designed to obtain the correct vertical dimension in full upper dentures. Furthermore, the imprint of the incisive papilla is a dependable reference point for measuring the height of the centrals above the ridge of a denture; to reproduce the position of the upper centrals from an immediate denture; and to maintain, during the process of setting up the centrals, the length as well as the anterior-posterior position, as recorded by a bite rim. Furthermore, the incisive papilla is a dependable reference point for a technique designed to make a scientific study of any change in the height of the teeth and/or any preselected portion of the maxillary process. It also follows that the incisive papilla may serve as a dependable reference point for a technique designed to make a simple symmetroscopic examination, as well as to make a complete three dimensional survey of the maxilla for a study related to other dental sciences.

In the drawings forming a part of this application there has been shown a presently preferred form of the instrument for the execution of diagnostic technique based on the observation that the incisive papilla constitutes a stable anatomical point from which measurements may be taken. The technique and method herein involved will become clear as an explanation of the instrument and its use proceeds.

In the drawings:

Fig. 1 shows a sagittal cross sectional view of a pre-extraction maxillary record model with my novel dental gauge in position for ascertaining the length and inclination of a maxillary central.

Fig. 2 is a plan view of the gauge.

Fig. 3 shows the gauge in position on a maxillary edentulous model having thereon a maxillary base plate, the model and base plate being shown in sagittal cross sectional view.

Fig. 4 is a view partially in cross section showing the position of the gauge when used to measure the height and transverse position of the posterior section of the occlusal plane of an immediate or partial denture.

Fig. 5 shows the gauge in position for measuring the height and transverse position of the posterior section of the occlusal plane on a model.

Fig. 6 is an elevational view of the palatal pin foot.

Fig. 7 is a view taken at 45° to Fig. 6.

Fig. 8 is a view of the incisal table taken from below.

Fig. 9 shows the gauge in position for the making of measurements with respect to the centrals on an immediate denture.

Fig. 10 is a fragmentary face view of the incisal table guide.

Fig. 11 is a plan view of an occlusal plane arm.

Fig. 12 is a cross sectional view through the sleeve portion of the incisal table, and Fig. 13 is a cross sectional view through an occlusal plane arm and its supporting structure.

The gauge includes a horizontal arm 10, and a vertical arm 12 arranged at right angles to the horizontal arm 10, the vertical arm 12 serving as an incisal table guide. Depending from the horizontal arm 10 in fixed position thereon is a papilla pin 14.

Adapted for movement along the vertical arm 12 is an incisal table 16 which includes a sleeve portion 18 adapted to embrace the vertical arm 12 for sliding movement therealong. The sleeve portion 18 of the incisal table has a screw threaded aperture 20 in the front face thereof for receiving an adjusting screw 22 that bears against a tension spring 24 between its inner end and the face of the vertical arm. By means of the adjusting screw 22, the tension of the spring 24 against the face of the vertical arm 12 may be regulated for the purpose of holding the incisal table at any desired position of adjustment during a measuring operation.

One or both lateral faces of the incisal table have suitable graduations 26 marked thereon, and the outer face of the vertical incisal table guide arm 12 has graduations 28 and 30 provided along opposite edges thereof. In this regard it is to be noted that the incisal table 16 has a passage 15 extending vertically through the horizontal arm thereof for accommodating the papilla pin 14 with the axis thereof coinciding with the zero point of the scale 26.

The distally extending finger of the incisal table 16 has provided on the under surface thereof a table center line 66. It is important to know the position of the median line formed at the contact of the right and left centrals so that the artificial teeth can be set in a normal transverse position. For this purpose the relationship of the median line and the incisal table center line 66 is noted.

The distal end of the horizontal gauge arm 10 has provided therein a palatal pin guide slot 32 through which a palatal pin 34 extends and in which it is adapted to operate. Seated in the palatal pin slot 32 is an internally screw threaded palatal pin bushing 36 which the screw threads 38 on the palatal pin 34 are adapted to engage. The palatal pin bushing 36 extends through a clamping collar 40 to which it is fixed, and this collar has extending laterally therefrom a screw threaded lug 42 which is adapted to pass through a clamping slot 44 in a clamping flange 46 which extends upwardly from one edge at the rear portion of the horizontal arm 10.

The clamping collar 40 is held in any adjusted position of the palatal pin bushing 36 by tightening a thumb nut 48 against the outer face of the clamping flange 46. The palatal pin bushing 36 and the clamping collar 40 are surmounted by a nut 50 upon which rests on occlusal plane arm 52. The arm 52 is held in position by means of a lock nut 54.

The occlusal plane arm is best shown in Fig. 11 wherein it appears to include a bifurcated end 56, which is adapted to facilitate its assembly with the palatal pin 34. The arm 52 has provided therethrough a plurality of screw threaded passages 58 which are adapted to receive an occlusal plane pin 60 which is screw threaded for engagement with the internal screw threads of the passages 58. The occlusal plane pin may be threaded through any selected one of the several passages 58, depending on the lateral distance of the measurement to be made, until the reduced end 62 of the occlusal plane pin is in contact with the surface whose measurement is to be determined, and at that point a lock nut 64 may be utilized to maintain the adjusted position of the pin 60. One or a plurality of occlusal plane arms may be provided in each instrument. The free end palatal pin 34 terminates in a foot 68 which is bifurcated to more securely rest the same on the relatively flat post dam area of a model or denture.

In the prosthesis technique it is common to provide a pre-extraction model as a guide in the subsequent denture structure. Accordingly, Fig. 1 shows a pre-extraction maxillary record model 100 which clearly shows the bite ridge 102, a model of a maxillary central 104, the incisal papilla 106, and the relative flat palatal area 108 adjacent the Median Raphe.

After the making of the pre-extraction record model, and after the resorption process has been completed, it is necessary to make a maxillary edentulous model 110 as shown in Fig. 3. This model will include an impression of the incisive papilla 106, and a reproduction of the Median Raphe area 108 in the same position and form as found in the pre-extraction record model. Other tissues subject to the resorption process will have been altered during resorption but because of the stable nature of the incisive papilla 106 and the palatal area adjacent the Median Raphe, it remains possible, using these points and particularly the papilla point, upon which to base measurements for the correct setting of the artificial teeth in a base plate 112 overlying the maxillary edentulous model 110 in Fig. 3. The procedure is as follows: The gauge is first placed on the pre-extraction model and while the papilla pin 14 is resting on a selected spot of the incisive papilla 106, the horizontal arm of the gauge is brought into parallelism with the plane of an area of the Median Raphe 108 and of the spot on the incisive papilla 106, by adjusting the length and horizontal position of palatal pin 34 until an area adjacent each side of the Median Raphe is found on which the bifurcations of the foot 68 will rest flush on the palatal portion of the model. The adjustment of the pin is then secured by manipulating the clamping nut 48.

The incisal table 16 is then moved along the vertical arm 12 of the gauge until the under face thereof is in contact with the tooth model 104. This being a maxillary central, it will be the prosthodontist's objective to determine the length of the tooth and the inclination thereof. Accordingly, the horizontal, or anterior-posterior position as well as the vertical inclination of the tooth can be noted on the scale 26 on the side face of the incisal table whereas its elevation or horizontal plane can be determined on the scale 30 along one edge of the vertical gauge arm.

The base plate 112 is apertured to expose the impression of the papilla in the edentulous model and it is also apertured to expose the face of the model in the Median Raphe area wherein the palatal pin is adapted to rest. In transferring the measurements of the central, it is merely necessary to transfer the gauge from the pre-extraction model onto the edentulous model with the foot of the palatal pin 34 and the papilla pin resting on the same areas of the Median Raphe of the edentulous model. It is possible then to seat the artificial central in the base plate 112 exactly in accordance with the positions noted on the scales while taking a reading on the pre-extraction record model.

The occlusal plane of the posteriors is determined in exactly the same manner, and for an illustrated procedure thereof, reference is made to Fig. 5 wherein 114 represents the model of a tooth extending from a pre-extraction model 116. In this case, it is equally important to position the papilla pin 14 on the record model impression of the incisive papilla, while the horizontal arm of the gauge is brought into parallelism with the posterior Medium Raphe and anterior papilla areas of the model by adjusting the palatal pin 34. The occlusal plane arm 52 is swung laterally with respect to the horizontal arm 10 of the gauge until the occlusal plane pin 60 is in a position over the posterior whose occlusal plane is to be determined. The pin 60 is then lowered into contact with the tooth model 114, and such adjustment is maintained by tightening the lock nut 64. The measurement so obtained is then transferred to the edentulous model where it is used to determine the exact position of that part of the posterior section of the occlusal plane under examination.

The method is equally operative and the gauge equally effective to transfer measurements from an immediate denture to a base plate of a new denture because the base plate will have a distinct impression corresponding to the incisive papilla. Thus, in Fig. 9, the immediate denture 118 will include a papilla depression 120 with which the papilla pin 14 may be oriented. Thus, to determine the length, position of the incisal edges and inclination of the centrals of an immediate denture, the measurement is achieved from above, i. e., while the papilla pin 14 is rested flat on the papilla depression 120 in the plate 118, the horizontal arm 10 of the gauge is placed in substantial parallelism therewith, by adjusting the position of palatal pin 34, until an area adjacent each side of the Medium Raphe is found on which the bifurcations of the foot 68 will rest flush on the palatal portion of the denture. In this case, the incisal table 16 is moved upwardly so that its upper surface contacts the incisal edge of the central 122, whereupon the inclination of the vertical plane may be read on the scale 26. In this case, however, the horizontal plane of the incisal edge of the central is read on the facial scale 28 appearing along one edge of the vertical arm 12 of the scale. In accordance with this practice, the measurements so taken can be directly transferred to a base plate of a new denture in which the central is to be set.

The same procedure is followed in determining the occlusal plane of the maxilla posteriors of a denture as shown in Fig. 4. Here the papilla pin 14 is again positioned on the papilla depression in the roof of the base plate 124, the horizontal arm 10 of the gauge is brought into parallelism by adjusting the palatal pin 34 and the occlusal plane pin 60 is adjusted until its reduced point 62 is in contact with the base plate 124. The occlusal plane of the posterior 126 may now be determined by measuring with calipers the distance between the occlusal surface of the posterior 126 and the plane of the occlusal arm. With this measurement known, the same can be transferred to a new denture simply by duplicating the conditions prevailing when the measurement was made on the model denture.

It will appear, therefore, from the foregoing that a method and instrument have been provided for determining the critical planes of key teeth and for transferring such measurements either from immediate dentures or pre-extraction models to edentulous models and base plates for the proper fitting of artificial teeth in base plates of dentures under construction. It will also appear from the foregoing that in each intstance the stable anatomical point provided by the incisive papilla has been employed as the reference point for both anterior and posterior measurements. The gauge herein shown is simply a convenient instrumentality for determining and transferring the measurements under question, and the form thereof may be varied within the limits of convenience so long as the incisive papilla is used as the reference point from which the gauge is operated. The knowledge that the incisive papilla is a stable reference point may be the basis for the design for instruments for the general orthodontic survey of the maxillary denture.

Having described the method and one form of the device for conveniently practicing the method, what I claim as my invention is defined in the following:

1. In a dental gauge for determining the position of teeth in the maxillary arch, a base member consisting of a horizontal arm and a vertical arm, a papilla pin depending from the under face of said horizontal arm in parallel relation to said vertical arm, the free end of said pin being adapted to rest on the impression of the incisive papilla of the maxilla, a vertically adjustable pin extending downwardly from the distal end of said horizontal arm for adjustably supporting the distal end of said horizontal arm, means for supporting said pin on said arm for sliding movement therealong whereby the same may be located over the post-dam area of the arch, a scale on a face of said vertical arm and an incisal table having a distally extending finger slidably mounted on the vertical arm of said base for measuring the horizontal and vertical position of the incisal edge of anterior teeth.

2. In a dental gauge for determining the position of the teeth in the maxillary arch, a base member consisting of a horizontal arm and a vertical arm having a distally extending incisor measuring table having a finger extending therefrom mounted for sliding movement along said vertical arm, a fixed papilla pin depending from the under face of said horizontal arm in parallel relation to said vertical arm for supporting the forward end of said horizontal arm on a selected surface, a papilla pin passage in the finger of said table to permit the free movement of said table along said vertical arm, and a vertically adjustable pin extending through the distal end of said horizontal arm for adjustably supporting the distal end of said horizontal arm.

3. In a dental gauge for determining the position of teeth in the maxillary arch, a base member consisting of a horizontal arm and a vertical arm, a papilla pin depending from the under side of said horizontal arm in parallel relation to said vertical arm, the free end of said pin being adapted to rest on the impression of the incisive papilla of the maxilla, a vertically adjustable pin extending through the distal end of said horizontal arm for adjustably supporting the distal end of said horizontal arm, and an occlusal plane arm having a vertically adjustable occlusal plane pin at the free end thereof, said arm being pivotally supported at one end at the distal end of said horizontal arm.

4. In a dental gauge for determining the position of teeth in the maxillary arch, a base member consisting of a horizontal arm and a vertical arm, a papilla pin depending from the under side of said horizontal arm in parallel relation to said vertical arm, the free end of said pin being adapted to rest on the impression of the incisive papilla of the maxilla, a horizontally and vertically adjustable pin extending through the distal end of said horizontal arm for adjustably supporting the distal end of said horizontal arm, an incisal table having a distally extending finger slidably mounted on the vertical arm of said base for measuring the horizontal and vertical position of the incisal edge of anterior teeth, an occlusal plane arm pivotally mounted at one of its ends on the distal end of said horizontal arm, and a vertically adjustable pin in the free end of said occlusal plane arm for locating the occlusal plane of posterior teeth.

ROBERT N. HARPER.

REFERENCES CITED

The following references are of record in the file of this patent:

UNITED STATES PATENTS

| Number | Name | Date |
|---|---|---|
| 1,662,670 | Harter | Mar. 13, 1928 |
| 1,786,915 | McLean | Dec. 30, 1930 |
| 1,864,804 | Clark | June 28, 1932 |